(12) United States Patent
Takeuchi

(10) Patent No.: US 11,019,622 B2
(45) Date of Patent: May 25, 2021

(54) INFORMATION PROCESSING APPARATUS AND CONTROL METHOD

(71) Applicant: CANON KABUSHIKI KAISHA, Tokyo (JP)

(72) Inventor: Takuya Takeuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 25 days.

(21) Appl. No.: 15/971,844

(22) Filed: May 4, 2018

(65) Prior Publication Data
US 2018/0332586 A1 Nov. 15, 2018

(30) Foreign Application Priority Data
May 12, 2017 (JP) .............................. JP2017-095913

(51) Int. Cl.
| | | |
|---|---|---|
| *H04W 72/04* | (2009.01) | |
| *H04W 76/10* | (2018.01) | |
| *H04W 48/16* | (2009.01) | |
| *H04W 84/12* | (2009.01) | |
| *H04L 12/24* | (2006.01) | |

(52) U.S. Cl.
CPC ....... *H04W 72/0453* (2013.01); *H04W 48/16* (2013.01); *H04W 76/10* (2018.02); *H04L 41/22* (2013.01); *H04W 84/12* (2013.01)

(58) Field of Classification Search
CPC . H04W 72/0453; H04W 48/16; H04W 76/10; H04W 84/12; H04L 41/22
See application file for complete search history.

(56) References Cited

U.S. PATENT DOCUMENTS

| | | | | |
|---|---|---|---|---|
| 9,894,604 | B1* | 2/2018 | Tran | ...................... H04W 48/20 |
| 9,985,846 | B1* | 5/2018 | Roman | ............... H04L 41/0833 |
| 10,200,944 | B2* | 2/2019 | Shimizu | ................. H04B 7/155 |
| 2006/0002352 | A1 | 1/2006 | Nakamura | |
| 2008/0049779 | A1* | 2/2008 | Hopmann | ........... H04L 12/2807 |
| | | | | 370/431 |
| 2008/0175166 | A1* | 7/2008 | Oerton | .................. H04W 48/16 |
| | | | | 370/254 |
| 2010/0067406 | A1* | 3/2010 | Suzuki | ................. H04W 48/16 |
| | | | | 370/254 |
| 2010/0124332 | A1* | 5/2010 | Arena | ................. H04L 63/0457 |
| | | | | 380/270 |

(Continued)

FOREIGN PATENT DOCUMENTS

| | | |
|---|---|---|
| CN | 104301884 A | 1/2015 |
| CN | 105163372 A | 12/2015 |

(Continued)

*Primary Examiner* — Jay P Patel
(74) *Attorney, Agent, or Firm* — Canon U.S.A., Inc. IP Division

(57) ABSTRACT

A control method for controlling an information processing apparatus communicating with a communication apparatus capable of performing at least wireless communication using a first frequency band and wireless communication using a second frequency band includes transmitting connection information and frequency band information to the communication apparatus upon receipt of an execution instruction, where the connection information is used to wirelessly connect to the external apparatus and the frequency band information is related to a frequency band used to wirelessly connect to the external apparatus.

25 Claims, 8 Drawing Sheets

(56) References Cited

U.S. PATENT DOCUMENTS

| | | | | |
|---|---|---|---|---|
| 2010/0142502 A1* | 6/2010 | Shiraki | H04W 48/16 | 370/338 |
| 2010/0246416 A1* | 9/2010 | Sinha | H04W 24/06 | 370/250 |
| 2014/0031078 A1* | 1/2014 | Nishikawa | H04W 40/24 | 455/552.1 |
| 2014/0286190 A1* | 9/2014 | Vallabhu | H04W 52/0274 | 370/254 |
| 2014/0369271 A1* | 12/2014 | Amini | H04W 28/26 | 370/329 |
| 2015/0116746 A1* | 4/2015 | Park | G06F 3/1292 | 358/1.13 |
| 2015/0237658 A1* | 8/2015 | Fontaine | H04W 76/10 | 370/311 |
| 2015/0250012 A1* | 9/2015 | Shibata | H04W 84/20 | 370/254 |
| 2015/0271863 A1* | 9/2015 | Matsuyama | H04W 76/14 | 455/41.2 |
| 2015/0351012 A1* | 12/2015 | Chhabra | H04W 48/16 | 455/434 |
| 2016/0100394 A1 | 4/2016 | Tachiwa | | |
| 2016/0219469 A1* | 7/2016 | Rothery, III | H04W 36/0077 | |
| 2017/0070951 A1* | 3/2017 | Takeuchi | H04W 48/20 | |
| 2017/0093625 A1* | 3/2017 | Pera | H04L 43/08 | |
| 2017/0105216 A1* | 4/2017 | Jung | H04W 72/02 | |
| 2017/0127384 A1* | 5/2017 | Shimada | H04W 76/12 | |
| 2017/0134255 A1* | 5/2017 | Amini | H04L 43/10 | |
| 2017/0156172 A1* | 6/2017 | Yokoyama | H04W 68/12 | |
| 2017/0295311 A1* | 10/2017 | Tokunaga | H04N 1/00281 | |
| 2018/0091365 A1* | 3/2018 | Nakajima | H04L 63/10 | |
| 2018/0184296 A1* | 6/2018 | Hunt | H04W 76/14 | |
| 2018/0206184 A1* | 7/2018 | Bahr | H04W 24/02 | |
| 2018/0364959 A1* | 12/2018 | Inoue | H04W 52/0258 | |
| 2019/0020766 A1* | 1/2019 | Omori | H04W 4/00 | |
| 2019/0075469 A1* | 3/2019 | Mahoney | H04W 16/12 | |
| 2019/0289648 A1* | 9/2019 | Kim | H04L 41/0803 | |

FOREIGN PATENT DOCUMENTS

| | | |
|---|---|---|
| JP | 2006-050587 A | 2/2006 |
| JP | 2010-087922 A | 4/2010 |
| JP | 2014-212412 A | 11/2014 |
| JP | 2016-72728 A | 5/2016 |

* cited by examiner

FIG.2
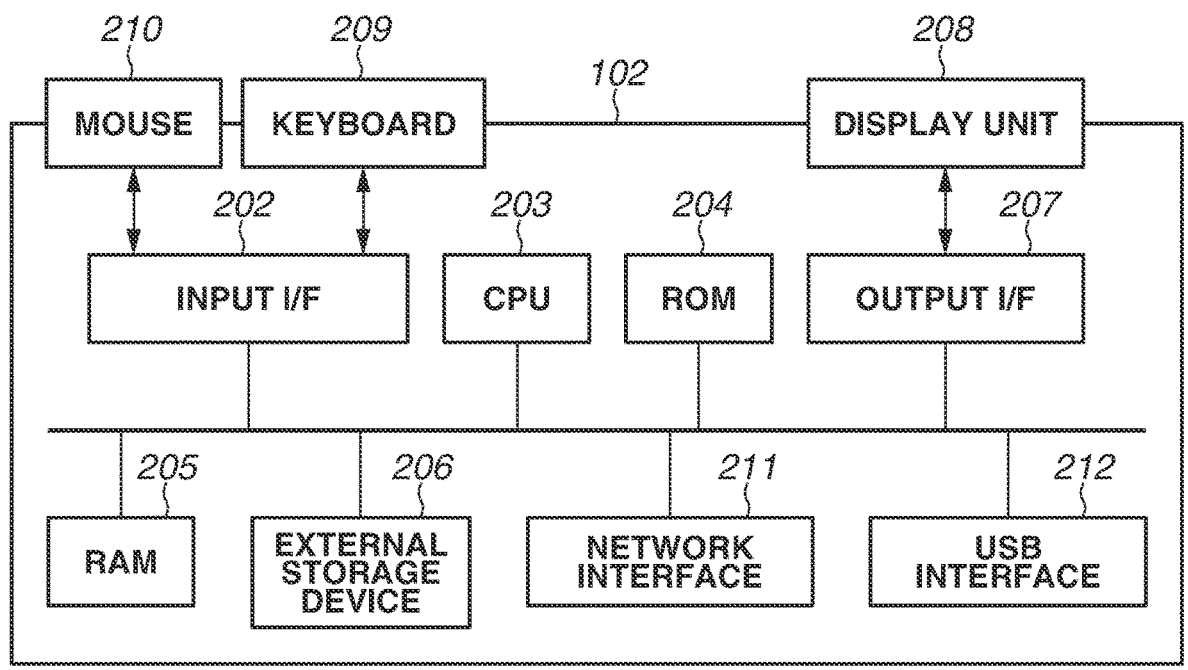
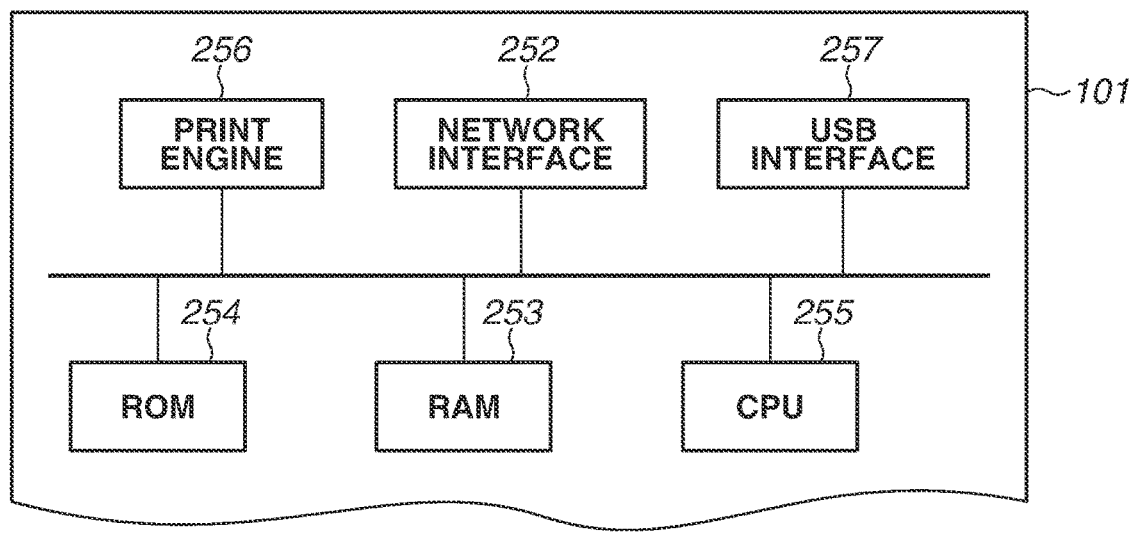

FIG.8

| MANUAL SETTING SCREEN | 800 |

INPUT INFORMATION ABOUT WIRELESS LAN ROUTER IN USE

- SSID: SSID_XXXX — 801
- ENCRYPTION METHOD: WEP — 802
- PASSPHRASE: PassWord_XXXXX — 803
- FREQUENCY BAND: 2.4 GHz — 804

806 — CANCEL    SET — 805

INFORMATION PROCESSING APPARATUS AND CONTROL METHOD

BACKGROUND

Field

The present disclosure relates to an information processing apparatus and a control method.

Description of the Related Art

In a known technique, an information processing apparatus, such as a personal computer and a smart phone, performs processing for connecting a communication apparatus, such as a printer, and an external apparatus, such as an access point.

Japanese Patent Application Laid-Open No. 2016-72728 discusses a technique in which a communication partner apparatus connects a communication apparatus and an external apparatus by transmitting AP information (including SSID) for external apparatus identification to the communication apparatus.

In recent years, there has been an increase in the use of communication apparatuses that utilize a plurality of frequency bands (for example, 2.4 GHz and 5 GHz). Such communication apparatuses, even after information about an external apparatus is received from an information processing apparatus, is unable to identify which frequency band is to be used to connect to the external apparatus. Thus, there has been a problem that processing for connecting a communication apparatus and an external apparatus may not be suitably performed by an information processing apparatus.

SUMMARY

The present disclosure is directed to suitably performing processing for connecting a communication apparatus that utilizes a plurality of frequency bands and an external apparatus.

According to an aspect of the present disclosure, a method for controlling an information processing apparatus communicating with a communication apparatus capable of performing at least wireless communication using a first frequency band and wireless communication using a second frequency band, the method including receiving an execution instruction to execute processing for wirelessly connecting the communication apparatus and an external apparatus, and transmitting, in response to receiving the execution instruction, connection information and frequency band information to the communication apparatus, where the connection information is used to wirelessly connect to an external apparatus and the frequency band information is related to a frequency band used to wirelessly connect to the external apparatus. In a case where the connection information and the frequency band information have been transmitted to the communication apparatus, a frequency band corresponding to the transmitted frequency band information from among the first and the second frequency bands is preferentially used, and wherein the communication apparatus and the external apparatus are connected based on the connection information.

Further features will become apparent from the following description of exemplary embodiments with reference to the attached drawings.

BRIEF DESCRIPTION OF THE DRAWINGS

FIG. 2 illustrates hardware configurations of a communication apparatus and an information processing apparatus.

FIG. 8 illustrates an example of a manual setting screen.

DESCRIPTION OF THE EMBODIMENTS

Figure 1:
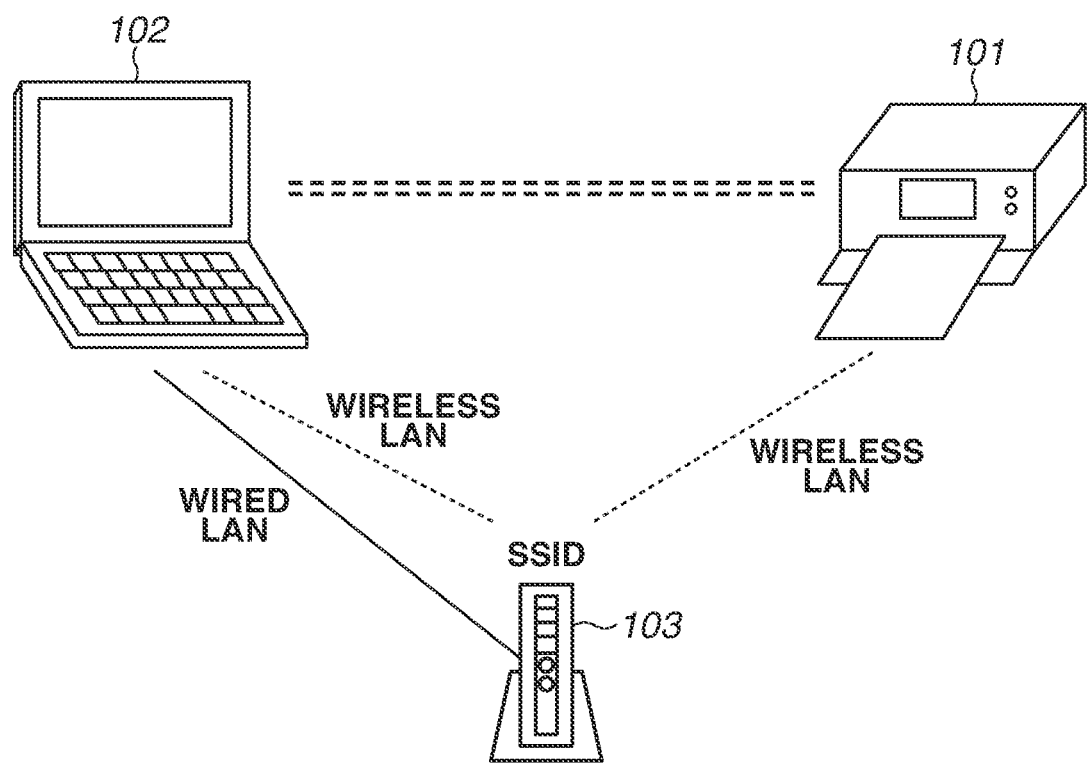
FIG. 1 illustrates a configuration of a communication system.

Exemplary embodiments will be described in detail below with reference to the accompanying drawings. The following exemplary embodiments do not limit the present disclosure within the ambit of the appended claims. Not all of the combinations of the features described in the present exemplary embodiment are essential to the solutions for the present disclosure.

A first exemplary embodiment will be described in detail below. An information processing apparatus and a communication apparatus included in a communication system according to the present exemplary embodiment will be described below. While, in the present exemplary embodiment, a personal computer (PC) is described as an example of an information processing apparatus, an information processing apparatus is not limited thereto. A portable terminal, smart phone, tablet terminal, personal digital assistant (PDA), digital camera, and other various types of apparatuses are applicable as an information processing apparatus. While, in the present exemplary embodiment, a printer is described as an example of a communication apparatus, a communication apparatus is not limited thereto. Various types of apparatuses that wirelessly communicate with an information processing apparatus are applicable as a communication apparatus. For example, the present exemplary embodiment is applicable to an ink-jet printer, full color laser beam printer, and monochrome printer. The present exemplary embodiment is applicable to a printer as well as a copying machine, facsimile machine, portable terminal, smart phone, PC, tablet terminal, PDA, digital camera, music playback device, and television. The present exemplary embodiment is also applicable to a multifunction peripheral including a plurality of functions including a copy function, FAX function, and print function.

The configurations of the information processing apparatus according to the present exemplary embodiment and the communication apparatus that communicates with the information processing apparatus according to the present exemplary embodiment will be described below. While the present exemplary embodiment will be described below centering on the following configuration as an example, the present exemplary embodiment is applicable to an apparatus that communicates with a communication apparatus and does not particularly limit functions as illustrated in the accompanying drawings.

Hardware configurations of a communication apparatus 101 and an information processing apparatus 102 will be described below with reference to FIG. 2.

The information processing apparatus 102 includes an input interface (I/F) 202, a central processing unit (CPU) 203, a read only memory (ROM) 204, a random access memory (RAM) 205, an external storage device 206, an output I/F 207, a display unit 208, a keyboard 209, and a mouse 210. The information processing apparatus 102 also includes a network interface (first communication unit) 211 and a universal serial bus (USB) interface (second communication unit) 212.

The input I/F 202 is an interface for inputting data and receiving an operation instruction from a user through an operation of the mouse 210 and the keyboard 209.

The CPU 203 is a system control unit and a processor for controlling the entire information processing apparatus 102.

The ROM 204 stores fixed data including control programs to be executed by the CPU 203, data tables, and built-in operating system (hereinafter referred to as an OS) programs. According to the present exemplary embodiment, each control program stored in the ROM 204 performs software execution control, such as scheduling, task switching, and interruption processing under control of the built-in OS stored in the ROM 204.

The RAM 205 includes a static random access memory (SRAM) that needs a backup power source. Since data in the RAM 205 is retained by a primary cell for data backup (not illustrated), important data, such as program control variables, can be stored without volatilization. The RAM 205 also includes a memory area for storing setting information about the information processing apparatus 102 and management data about the information processing apparatus 102. The RAM 205 is also used as a main memory and a work memory for the CPU 203.

The external storage device 206 stores an application providing a printing execution function and a print job generation program providing a print job interpretable by the communication apparatus 101. The external storage device 206 also stores various programs such as an information transmission/reception control program for transmitting and receiving data to/from the communication apparatus 101 connected via a network interface 211 and a USB interface 212, and stores various information to be used by these programs. The external storage device 206 also stores a setup program (described below).

An output I/F 207 is an interface that controls the display unit 208 to display data and provide a notification of statuses of the information processing apparatus 102.

The display unit 208 includes light emitting diodes (LEDs) and a liquid crystal display (LCD) and displays data and provides a notification of statuses of the information processing apparatus 102. The display unit 208 is also provided with an operation unit including numerical input keys, a mode setting key, a determination key, a cancellation key, and a power key. The information processing apparatus 102 can receive an input from the user via the display unit 208.

The network interface 211 controls wireless communication and communication processing via a wired local area network (LAN) cable. More specifically, the network interface 211 connects with the communication apparatus 101 and an external apparatus external to both the information processing apparatus 102 and the communication apparatus 101 via a wireless or wired LAN to perform data communication. For example, the network interface 211 connects to an access point (not illustrated) in the communication apparatus 101. When the network interface 211 connects to an access point in the communication apparatus 101, the information processing apparatus 102 and the communication apparatus 101 can communicate with each other. In addition, the network interface 211 can directly communicate with the communication apparatus 101 via wireless communication or via an external apparatus external to both the information processing apparatus 102 and the communication apparatus 101. External apparatuses include an external access point and an apparatus that replays communication other than an access point. While, in the present exemplary embodiment, an Institute of Electrical and Electronics Engineers (IEEE) 802.11 series standard (Wireless Fidelity (Wi-Fi®)) is used, for example, Bluetooth® is also usable. Wireless communication methods include, for example, Wi-Fi® and Bluetooth®. External access points include, for example, a router apparatus. According to the present exemplary embodiment, a connection method in which the information processing apparatus 102 and the communication apparatus 101 directly connect with each other without intervention of an external access point is referred to as a direct connection method. A connection method in which the information processing apparatus 102 and the communication apparatus 101 connect with each other via an external access point is referred to as an infrastructure connection method. The information processing apparatus 102 can include a plurality of the network interfaces 211 to perform communication through a plurality of communication methods. More specifically, the information processing apparatus 102 can include communication interfaces based on short-range wireless communication methods such as Bluetooth® Low Energy, Near Field Communication, and WiFi Aware™. The information processing apparatus 102 does not necessarily need to include the network interface 211 for wireless communication. More specifically, the information processing apparatus 102 can have only the network interface 211 for wired communication and a USB interface 212 (described below) as interfaces for communicating with other apparatuses.

The USB interface 212 controls USB connection via a USB cable. More specifically, the USB interface 212 connects with the communication apparatus 101 and an apparatus such as an external access point via USB, and performs data communication.

The communication apparatus 101 includes a network I/F (communication unit) 252, a RAM 253, a print engine 256, a ROM 254, a CPU 255, and a USB interface 257.

The network interface 252 controls wireless communication and communication processing via a wired local area network (LAN) cable. More specifically, the network interface 252 includes an access point for connecting with an apparatus, such as the information processing apparatus 102, as an access point in the communication apparatus 101. The access point connects with the network interface 211 of the information processing apparatus 102. The network interface 252 can directly communicate with the information processing apparatus 102 through wireless communication or via an external access point. More specifically, the network interface 252 itself can operate as an access point as well as a child station that connects to an external access point. While, in the present exemplary embodiment, the IEEE-802.11 series standard (Wi-Fi®) is used, for example, Bluetooth® can also be utilized. The network interface 252 can include a hardware component that functions as an access point, and can operate as an access point by software for instructing the interface to function as an access point. The communication apparatus 101 can include a plurality of the network interfaces 252 to perform communication based on a plurality of communication methods. More specifically, the communication apparatus 101 can also include communication interfaces based on short-range wireless communication methods, such as Bluetooth® Low Energy, Near Field Communication, and WiFi Aware™.

The RAM 253 includes a SRAM that needs a backup power source. The RAM 253 stores data by using a primary battery for data backup (not illustrated) and can store important data including program control variables without volatilization. The RAM 253 also includes a memory area that stores setting information of the communication apparatus 101 and management data of the communication apparatus 101. The RAM 253 is also used as a main memory and a work memory for the CPU 255, and serves as a reception buffer for temporarily storing print information received from the information processing apparatus 102 and other various information.

The ROM 254 stores fixed data including control programs to be executed by the CPU 255, data tables, and OS programs. According to the present exemplary embodiment, each control program stored in the ROM 254 performs software execution control, such as scheduling, task switching, and interruption processing under control of the built-in OS stored in the ROM 254.

The CPU 255 is a system control unit and a processor for controlling the entire communication apparatus 101.

Based on the information stored in the RAM 253 or a print job received from the information processing apparatus 102, a print engine 256 performs image forming processing to apply a recording agent, such as ink, to a recording medium, such as paper, to form an image on the recording medium, and outputs the result of printing. A print job is a job instructing the communication apparatus 101 to perform the image forming processing.

According to the present exemplary embodiment, the communication apparatus 101 uses, for wireless connection, at least one or more of the 2.4 GHz and 5 GHz frequency bands based on the IEEE-802.11 series standard. The communication apparatus 101 includes communication channels corresponding to available frequency bands. For example, if the 2.4 GHz frequency band is available, the communication apparatus 101 includes 14 communication channels assigned to predetermined frequency bands out of the 2.4 GHz frequency band. For example, if the 5 GHz frequency band is available, the communication apparatus 101 includes 19 communication channels assigned to predetermined frequency bands out of the 5 GHz frequency band.

While the information processing apparatus 102 and the communication apparatus 101 share processing as described above as an example, the form of processing share is not limited thereto and other forms of processing share are also applicable.

FIG. 1 illustrates a configuration of a communication system according to the present exemplary embodiment. The information processing apparatus 102 is connected to an access point 103 via a wired LAN or wireless LAN. The access point 103 is a router apparatus that relays data communication between apparatuses (e.g., between an information processing apparatus and a communication apparatus). According to the present exemplary embodiment, a router apparatus serves as an access point to relay data communication between apparatuses connected to the access point (router apparatus). Communication methods used by the router apparatus include a wireless communication method and/or wired communication method. According to the present exemplary embodiment, the router apparatus includes at least a wireless LAN router function that performs communication via a wireless communication method.

The communication apparatus 101 is connected to the access point 103 via a wireless LAN. The information processing apparatus 102 is in a state that it can communicate with the communication apparatus 101 via the access point 103. A method of connection via an access point in this way is generally referred to as an infrastructure connection. When an infrastructure connection is configured, the communication apparatus 101 and the information processing apparatus 102 can communicate with apparatuses belonging to a network formed by the access point 103. When the access point 103 is connected to the Internet, the communication apparatus 101 and the information processing apparatus 102 can also use the Internet via the access point 103.

The present exemplary embodiment will be described below centering on a case where the information processing apparatus 102 performs setting processing (network setting processing) for establishing the infrastructure connection with the communication apparatus 101, the information processing apparatus 102, and the access point 103. More specifically, the information processing apparatus 102 transmits network setting information to the communication apparatus 101 to connect the communication apparatus 101 and the access point 103.

The communication apparatus 101 can connect to the access point 103 through an operation on the main body of the communication apparatus 101 even without receiving the network setting information from the information processing apparatus 102. However, a display unit or operation unit mounted on the communication apparatus 101 can be small, or the communication apparatus 101 may not be provided with a display unit or operation unit. In such a case, it is difficult to connect the communication apparatus 101 and the access point 103 through an operation on the main body of the communication apparatus 101. Therefore, according to the present exemplary embodiment, the communication apparatus 101 and the access point 103 are connected via the information processing apparatus 102.

More specifically, as the network setting processing, the information processing apparatus 102 transmits the network setting information to the communication apparatus 101 via wired or wireless communication. The network setting information includes, for example, connection information (Service Set Identifier, hereinafter referred to as SSID, and password) used to connect to the access point 103 as a connection destination of the communication apparatus 101. The connection information is transmitted from the communication apparatus 101 to the access point 103 in a case where the communication apparatus 101 requests the access point 103 for connection. The information processing apparatus 102 transmits such information to the communication apparatus 101 to wirelessly connect the communication apparatus 101 and the access point 103.

Wireless connection refers to a connection performed by using a specific frequency band. In recent years, apparatuses acting as the communication apparatus 101 have used a plurality of frequency bands (e.g., 2.4 GHz and 5 GHz). It is assumed that the communication apparatus 101 according to the present exemplary embodiment also performs wireless connection by using a plurality of frequency bands. In a case where the communication apparatus 101 connects to an access point, the communication apparatus 101 first searches for an access point (AP search) by using the communication channel corresponding to an available frequency band. Subsequently, by using the communication channel corresponding to the available frequency band, the communication apparatus 101 transmits a connection request to the access point corresponding to the thus-received connection information to wirelessly connect to the access point.

The communication apparatus 101 performing processing in this way has the following issue. If the communication apparatus 101 does not know which frequency band is to be used to wirelessly connect to an access point, the apparatus is unable to connect to the access point even if the apparatus receives the above-described connection information.

In a possible configuration of the communication apparatus 101, for example, if the communication apparatus 101 does not know which frequency band is to be used, the apparatus performs the AP search by using an available frequency band and then makes an attempt to connect to an access point. However, the communication apparatus 101 is generally unable to use a plurality of frequency bands at the same time. Therefore, in the above-described configuration, the communication apparatus 101 sequentially uses available frequency bands one by one. In this case, the communication apparatus 101 can make an attempt to connect to an access point by using a frequency band other than the frequency bands for connecting to an access point. More specifically, also in the above-described configuration, there is an issue that the communication apparatus 101 consumes time to connect to an access point or performs useless processing.

To that end, in the present exemplary embodiment, the communication apparatus 101 identifies which frequency band is to be used to wirelessly connect to an access point before making an attempt to connect to the access point.

Figure 3:
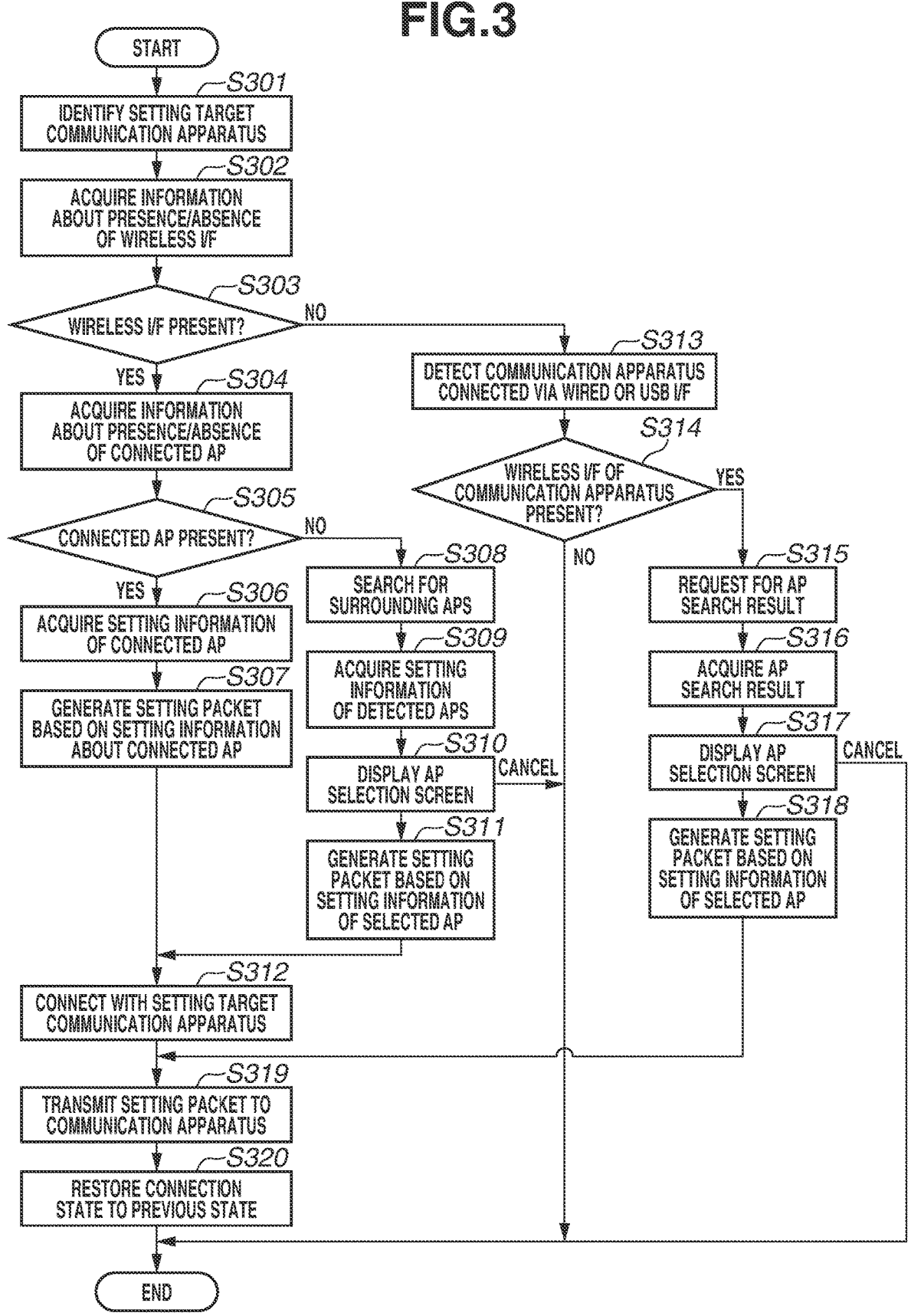
FIG. 3 is a flowchart illustrating network setting processing performed by the information processing apparatus according to a first exemplary embodiment.

FIG. 3 is a flowchart illustrating the network setting processing performed by the information processing apparatus 102 according to the first exemplary embodiment. The flowchart illustrated in FIG. 3 is implemented by the CPU 203 loading a program stored in the ROM 204 or the external storage device 206 into the RAM 205 and then executing the program. More specifically, the processing of the flowchart illustrated in FIG. 3 is implemented by a setup program that is a program for performing the network setting processing. The processing of the flowchart illustrated in FIG. 3 is started when a user operation (instruction for performing the network setting processing) that triggers the network setting processing is performed on a screen displayed by the setup program. The processing of the flowchart illustrated in FIG. 3 is started, for example, in response to activation of the setup program.

In step S301, the CPU 203 identifies an apparatus subjected to the network setting processing. More specifically, the CPU 203 acquires information about apparatuses in the vicinity of the information processing apparatus 102 by using an Application Program Interface (API) of the OS in the information processing apparatus 102. More specifically, the CPU 203 acquires information about apparatuses to be searched for by the network interface 211 and apparatuses connected via the USB interface 212. Then, using the acquired information, the CPU 203 displays a list of apparatuses connected to the interfaces included in the information processing apparatus 102 on the display unit 208. Apparatuses to be searched for by the network interface 211 include, for example, apparatuses operating as access points and apparatuses belonging to the network to which the information processing apparatus 102 belongs. According to the present exemplary embodiment, when performing the network setting processing on the communication apparatus 101, the user operates the main body of the communication apparatus 101 to instruct the communication apparatus 101 to operate in a predetermined mode called a setup mode. The setup mode refers to a mode in which the communication apparatus 101 receives the network setting processing and operates as a predetermined access point with a predetermined SSID. In a case where the communication apparatus 101 is operating in the setup mode, the communication apparatus 101 is detected in a search by the network interface 211 and is therefore displayed in the list. The information processing apparatus 102 may not include the network interface 211 for wireless communication, or the network interface 211 for wired communication may not be connected with any apparatus. In this case, only apparatuses connected via the USB interface 212 are displayed in the list. When the user selects the communication apparatus 101 in the displayed list, the CPU 203 identifies the communication apparatus 101 as an apparatus subjected to the network setting processing.

In step S302, the CPU 203 acquires information about whether the information processing apparatus 102 includes the network interface 211 for wireless communication by using an API of the OS in the information processing apparatus 102.

In step S303, the CPU 203 determines whether the information processing apparatus 102 includes the network interface 211 for wireless communication based on the information acquired in step S302. If the CPU 203 determines that the information processing apparatus 102 includes the network interface 211 for wireless communication (YES in step S303), the processing proceeds to step S304. If the CPU 203 determines that the information processing apparatus 102 does not include the network interface 211 for wireless communication (NO in step S303), the processing proceeds to step S313.

In step S304, the CPU 203 acquires information indicating whether the information processing apparatus 102 is connected to the access point 103 by using an API of the OS in the information processing apparatus 102.

In step S305, the CPU 203 determines whether the information processing apparatus 102 is wirelessly connected to the access point 103 based on the information acquired in step S304. If the CPU 203 determines that the information processing apparatus 102 is wirelessly connected to the access point 103 (YES in step S305), the processing proceeds to step S306. If the CPU 203 determines that the information processing apparatus 102 is not wirelessly connected to the access point 103 (NO in step S305), the processing proceeds to step S308.

In step S306, the CPU 203 identifies the access point 103 to which the information processing apparatus 102 is wirelessly connected as a connection destination of the communication apparatus 101. Then, the CPU 203 makes an inquiry to the access point 103 to which the information processing apparatus 102 is wirelessly connected, and acquires setting information related to the access point 103. The setting information related to the access point 103 includes, for example, setting information (SSID) for connecting to the access point 103 and information about frequency bands and encryption method currently used by the access point 103. According to the present exemplary embodiment, the access point 103 includes communication channels corresponding to at least one or more of the 2.4 GHz and 5 GHz frequency bands, and uses the communication channels for wireless connection.

In step S307, the CPU 203 performs processing for generating a setting packet based on the setting information acquired in step S306. The setting packet refers to information, corresponding to the network setting information, for connecting the communication apparatus 101 to the access point 103. In a case where the communication apparatus 101 is connected to the access point 103 to which the information processing apparatus 102 is wirelessly connected, infrastructure connection between the information processing apparatus 102 and the communication apparatus 101 is established. Thus, the CPU 203 generates a setting packet for connecting the communication apparatus 101 to the access point 103 to which the information processing apparatus 102 is wirelessly connected. More specifically, the setting packet includes setting information (SSID and password) for connecting to the access point 103 and information about the frequency bands and encryption method currently used by the access point 103. The frequency bands currently used by the access point 103 refer to frequency bands used to wirelessly connect to the access point 103. Upon completion of step S307, the processing proceeds to step S312.

In step S308, the CPU 203 searches for access points in the vicinity of the information processing apparatus 102 via the network interface 211 (AP search (search processing)). The AP search is performed by a known discovery process based on (in conformance with) the IEEE-802.11 series standard. More specifically, the AP search is performed by passive scan.

In step S309, the CPU 203 makes an inquiry to access points detected in the search in step S308 and acquires the setting information related to the access points. Details of the setting information are as described above. The CPU 203 acquires the setting information related to all of access points detected in the search in step S308.

Figure 4A:
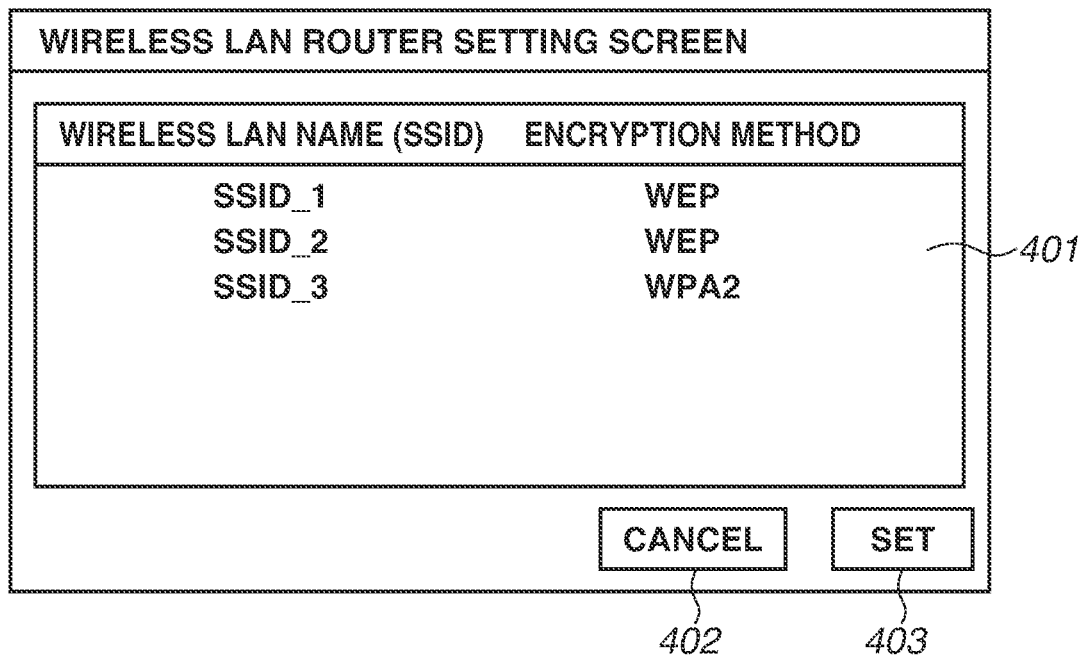
FIGS. 4A and 4B each illustrate an example of an access point selection screen.
Figure 4B:
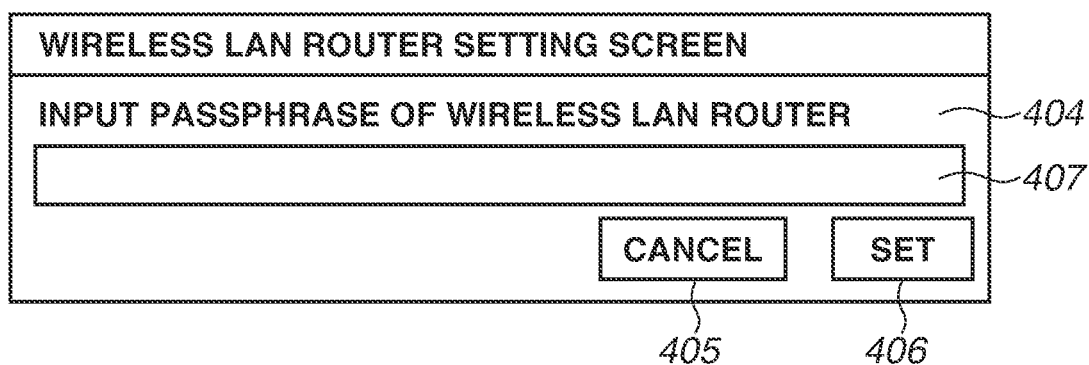

In step S310, the CPU 203 displays on the display unit 208 a list of access points detected in the search in step S308 based on the setting information acquired in step S309. More specifically, the CPU 203 displays an access point selection screen 401 as illustrated in FIG. 4A on the display unit 208. The access point selection screen 401 displays SSIDs and encryption methods of the access points detected in search in step S308. This screen is not limited to the configuration illustrated in FIG. 4A. The screen can display, for example, information about the frequency bands used for wireless connection by the access points detected in the search in step S308. The CPU 203 prompts the user to select any one access point from the list and identifies the selected access point (access point 103) as a connection destination of the communication apparatus 101. In this case, the CPU 203 also displays a cancel button 402 for canceling the network setting processing together with the list. In a case where the user selects the cancel button 402, the CPU 203 ends the processing. In a case where the user selects a set key 403, the CPU 203 displays a password (passphrase) input screen 404 as illustrated in FIG. 4B on the display unit 208. The user inputs a password for using the selected access point in an input area 407. In a case where the cancel button 405 is selected, the CPU 203 ends the processing. In a case where the set key 406 is selected, the processing proceeds to step S311.

In step S311, the CPU 203 performs processing to generate a setting packet based on the setting information acquired from the access point selected in step S310 and the password input in step S310. Details of a setting packet are as described above.

In step S312, the CPU 203 wirelessly connects the setting target apparatus identified in step S301 (here, communication apparatus 101) and the information processing apparatus 102. In a case where another apparatus, such as the access point 103, and the information processing apparatus 102 are wirelessly connected, the CPU 203 stores the setting information related to the other apparatus and then disconnects the connection between the other apparatus and the information processing apparatus 102. Subsequently, the CPU 203 wirelessly connects the communication apparatus 101 and the information processing apparatus 102. Upon completion of step S312, the processing proceeds to step S319.

In step S313, by using an API of the OS in the information processing apparatus 102, the CPU 203 detects the apparatus identified in step S301 (communication apparatus 101) that is connected via the USB interface 212 or the network interface 211 for wired communication. In this case, the CPU 203 acquires information about whether the communication apparatus 101 includes the network interface 252 for wireless communication from the communication apparatus 101. If there is no apparatus connected via the USB interface 212 or the network interface 211 for wired communication, the CPU 203 ends the processing.

In step S314, the CPU 203 determines whether the communication apparatus 101 includes the network interface 252 for wireless communication based on the information acquired in step S313. If the CPU 203 determines that the communication apparatus 101 includes the network interface 252 for wireless communication (YES in step S314), the processing proceeds to step S315. If the CPU 203 determines that the communication apparatus 101 does not include the network interface 252 for wireless communication (NO in step S314), the CPU 203 ends the processing.

The communication apparatus 101 can also search for access points in the vicinity of the communication apparatus 101 (AP search) via the network interface 252 for wireless communication. Thus, in step S315, the CPU 203 requests the communication apparatus 101 for the result of the AP search by the communication apparatus 101.

In step S316, the CPU 203 acquires the result of the AP search by the communication apparatus 101 (setting information about the access points detected in the AP search by the communication apparatus 101) from the communication apparatus 101. The communication apparatus 101 can perform the AP search upon receipt of the request in step S315 or at an arbitrary timing, for example, when power of the communication apparatus 101 is turned on.

In step S317, the CPU 203 displays on the display unit 208 a list of the access points detected by the communication apparatus 101 based on the setting information acquired in step S316. More specifically, the CPU 203 displays the access point selection screen 401 as illustrated in FIG. 4A on the display unit 208. The access point selection screen 401 displays SSIDs and encryption methods of the access points detected by the communication apparatus 101. This screen is not limited to the configuration illustrated in FIG. 4A. The screen can display, for example, information about the frequency bands used for wireless connection by the access points detected by the communication apparatus 101. The CPU 203 prompts the user to select an access point from the list and then identifies the selected access point (access point 103) as a connection destination of the communication apparatus 101. In this case, the CPU 203 also displays the cancel button 402 for canceling the network setting processing together with the list. If the user selects the cancel button 402, the CPU 203 ends the processing. If the user selects the set key 403, the CPU 203 displays the password (passphrase) input screen 404 as illustrated in FIG. 4B on the display unit 208. The user inputs a password for using the selected access point in an input area 407. If the cancel button 405 is selected, the CPU 203 ends the processing. If the set key 406 is selected, the processing proceeds to step S318.

In step S318, the CPU 203 performs processing to generate a setting packet based on the setting information acquired from the access point selected in step S317 and the password input in step S317. Details of a setting packet are as described above. The information about the frequency bands used for wireless connection by the access point selected in step S317 may not be included in the setting packet. This is because the communication apparatus 101 recognizes which frequency band is used by which access point in a case where the AP search is performed.

In step S319, the CPU 203 transmits the generated setting packet to the communication apparatus 101 identified in step S301. More specifically, the CPU 203 transmits the setting packet by using Simple Network Management Protocol (SNMP). SNMP is a protocol for performing monitoring and control of devices (including the communication apparatus 101) on the network to which the information processing apparatus 102 belongs. The CPU 203 performs communication using SNMP to enable performing information acquisition and setting on a database called Management Information Base (MIB) of the monitoring and control target device. Upon receipt of the setting packet, the communication apparatus 101 identifies the connection destination apparatus (access point 103) and the frequency bands used for wireless connection by the connection destination apparatus (frequency bands corresponding to the information about the frequency bands included in the setting packet) based on the setting packet. The communication apparatus 101 then searches for an apparatus with the SSID included in the setting packet by preferentially using the identified frequency bands. More specifically, the communication apparatus 101 performs only the search using the identified frequency bands and does not perform the search using frequency bands other than the identified frequency bands. This search is performed by a well-known discovery process based on the IEEE-802.11 series standard. More specifically, the communication apparatus 101 searches for an apparatus with the SSID included in the setting packet through an active scan using the identified frequency bands based on the setting packet. More specifically, the communication apparatus 101 broadcasts by sequentially using the communication channels corresponding to the frequency bands identified based on the setting packet, and waits for a response from an apparatus having the SSID included in the setting packet. The communication apparatus 101 receives a response to the broadcasting to detect an apparatus with the SSID included in the setting packet. Then, the communication apparatus 101 transmits a connection request by using the password included in the setting packet to the detected apparatus. This connects the communication apparatus 101 and the access point 103, and thus, infrastructure connection is established between the communication apparatus 101 and the information processing apparatus 102 if the information processing apparatus 102 connects to the access point 103.

In step S320, the CPU 203 restores the connection state of the information processing apparatus 102 to the connection state before the network setting processing. More specifically, in step S312, in a case where wireless connection is established between the communication apparatus 101 and the information processing apparatus 102 after the connection between another apparatus and the information processing apparatus 102 is disconnected, the CPU 203 reconnects the other apparatus and the information processing apparatus 102 by using the setting information stored at that time. If the connection state of the information processing apparatus 102 remains unchanged from the connection state before the network setting processing, the CPU 203 omits the processing in step S320.

As described above, according to the present exemplary embodiment, the CPU 203 identifies the frequency bands currently used by the access point 103 based on the acquired setting information, and then transmits a setting packet including information about the identified frequency bands to the communication apparatus 101. This configuration enables the communication apparatus 101 to identify which frequency band to use to wirelessly connect to the access point 103, thus enabling the communication apparatus 101 to promptly connect to the access point 103 by using the setting packet.

A second exemplary embodiment will be described in detail below. Specifically, according to the second exemplary embodiment, the communication apparatus 101 identifies the apparatus detected by the communication apparatus 101 as a connection destination apparatus of the communication apparatus 101, in preference to the apparatus to which the information processing apparatus 102 is connected and apparatuses detected by the information processing apparatus 102. More specifically, according to the second exemplary embodiment, in a case where access points using different frequency bands have the same SSID, the information processing apparatus 102 determines which access point is to be preferentially used by the communication apparatus 101. According to the second exemplary embodiment, a communication system similar to the one in the first exemplary embodiment is used, and, unless otherwise noted, elements similar to those described in the first exemplary embodiment are to be assumed.

Figure 5:
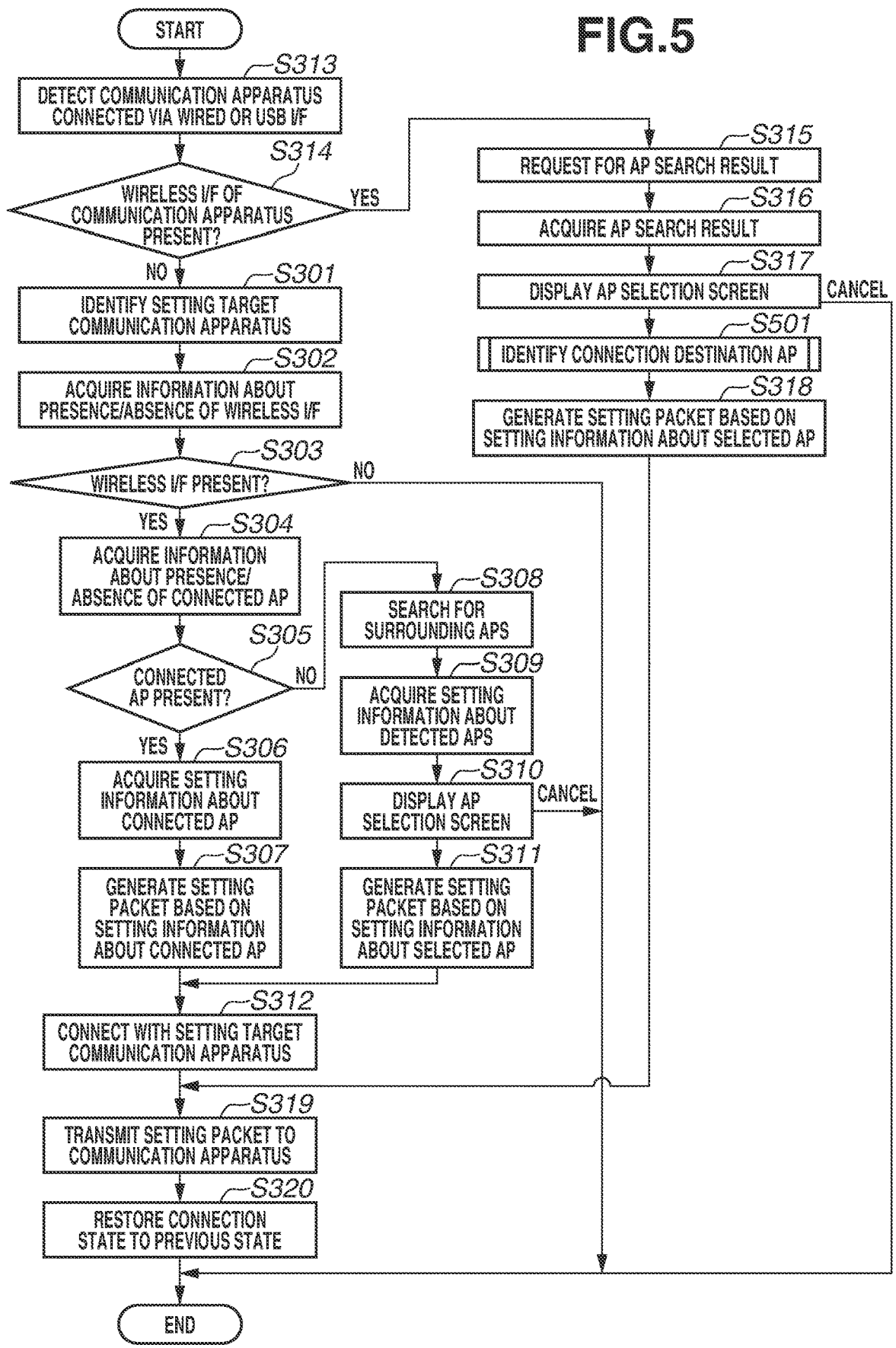
FIG. 5 is a flowchart illustrating network setting processing performed by an information processing apparatus according to a second exemplary embodiment.

FIG. 5 is a flowchart illustrating the network setting processing performed by the information processing apparatus 102 according to the second exemplary embodiment. The flowchart illustrated in FIG. 5 is implemented by the CPU 203 loading a program stored in the ROM 204 or the external storage device 206 into the RAM 205 and then executing the program. More specifically, the processing of the flowchart illustrated in FIG. 5 is implemented by the setup program. The processing of the flowchart illustrated in FIG. 5 is started when a user operation that triggers the network setting processing is performed on a screen displayed by the setup program. The processing of the flowchart illustrated in FIG. 5 is started, for example, in response to activation of the setup program.

Steps S301 to S320 are similar to those according to the first exemplary embodiment, and redundant descriptions thereof will be omitted.

According to the present exemplary embodiment, before performing the processing in steps S301, S302, and S303, the CPU 203 performs processing in steps S313 and S314.

More specifically, in step S313, by using an API of the OS in the information processing apparatus 102, the CPU 203 detects an apparatus (here, communication apparatus 101) connected via the USB interface 212 or the network interface 211 for wired communication. In this case, the CPU 203 acquires from the communication apparatus 101 information about whether the communication apparatus 101 includes the network interface 252 for wireless communication. In a case where there is no apparatus connected via the USB interface 212 or the network interface 211 for wired communication, the processing proceeds to step S301.

If the CPU 203 determines that the communication apparatus 101 includes the network interface 252 for wireless communication (YES in step S314), the processing proceeds to step S315. If the CPU 203 determines that the communication apparatus 101 does not include the network interface 252 for wireless communication (NO in step S314), the processing proceeds to step S301.

If the CPU 203 determines that the information processing apparatus 102 includes the network interface 211 for wireless communication (YES in step S303), the processing proceeds to step S304. If the CPU 203 determines that the information processing apparatus 102 does not include the network interface 211 for wireless communication (NO in step S303), the CPU 203 ends the processing.

According to the present exemplary embodiment, the CPU 203 performs the processing in step S317 and then processing in step S501. In a case where access points using different frequency bands and with the same SSID are included in the list, in step S317, the CPU 203 displays these access points not individually, but as one access point on the access point selection screen 401. The case where access points using different frequency bands and with the same SSID are included in the list is where, through a band steering function, a single wireless LAN router corresponding to a plurality of frequency bands enables access points using individually different frequency bands. While a plurality of access points using different frequency bands are enabled through the band steering function, an identical password is used to connect to each of the access points. When password input is completed in the processing in step S317, the processing proceeds to step S501.

In step S501, the CPU 203 identifies an access points as a connection destination of the communication apparatus 101. The processing in step S501 will be described in detail below with reference to FIG. 6.

Figure 6:
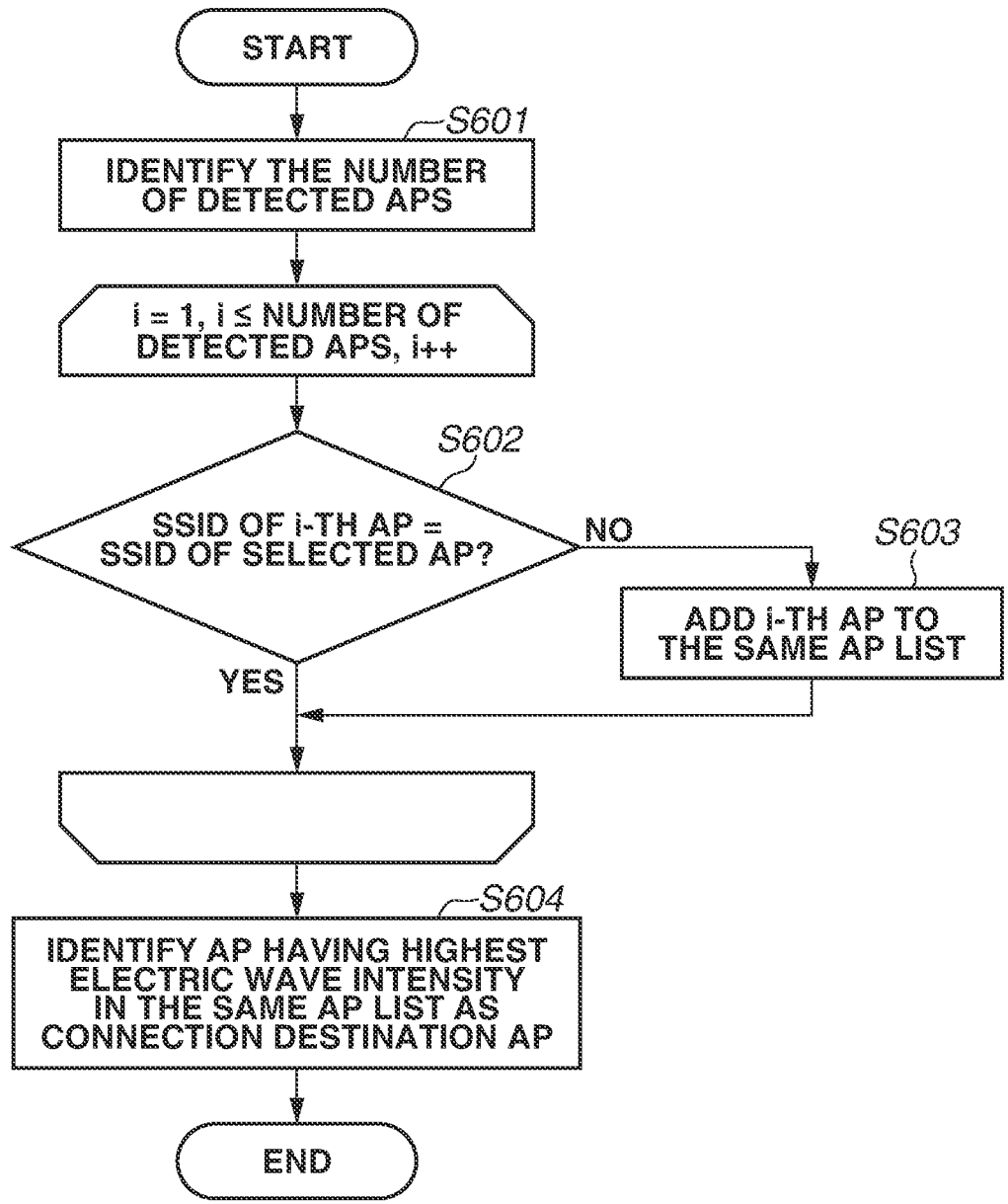
FIG. 6 is a flowchart illustrating processing in which the information processing apparatus identifies an access point as a connection destination of the communication apparatus.

FIG. 6 is a flowchart illustrating processing in which the information processing apparatus 102 identifies an access point as a connection destination of the communication apparatus 101. The flowchart illustrated in FIG. 6 is implemented by the CPU 203 loading a program stored in the ROM 204 or the external storage device 206 into the RAM 205 and then executing the program. More specifically, the processing of the flowchart illustrated in FIG. 6 is implemented by the setup program. The processing of the flowchart illustrated in FIG. 6 is performed as the processing in step S501 illustrated in FIG. 3.

In step S601, the CPU 203 identifies the number of access points detected by the communication apparatus 101 based on the setting information acquired from the communication apparatus 101 in step S316.

In step S602, the CPU 203 determines whether the SSID of the i-th access point out of the access points detected by the communication apparatus 101 is identical to the SSID of the access point selected by the user in step S317. The setting value i has an initial value of 1, and is incremented each time the processing in step S602 is repeated. If the CPU 203 determines that the two SSIDs are identical (YES in step S602), the processing proceeds to step S603. In step S603, the CPU 203 adds the i-th access point to the same AP list. If the CPU 203 determines that the two SSIDs are not identical (NO in step S602), the CPU 203 increments i and performs the processing in step S602 again. If the incremented setting value i exceeds the number identified in step S601, the processing proceeds to step S604.

If no other access points exist that have the same SSID of the access point selected by the user, then only a single access point is added to the same AP list in this processing. If a plurality of access points from among access points detected by the communication apparatus 101, that have the SSID of the access point selected by the user exist, this processing adds a plurality of access points to the same AP list.

In step S604, the CPU 203 automatically selects one access point from access points added to the same AP list (without a user operation). Each access point emits a beacon containing, for example, its own SSID. The communication apparatus 101 searches for access points in the vicinity of the communication apparatus 101 (performs the AP search) by searching for beacons emitted by the access points. The higher electric wave intensity of a beacon received in the AP search means that an access point emitting the beacon exists closer to the communication apparatus 101. As a result, the higher electric wave intensity of a received beacon means that the communication apparatus 101 can communicate with the access point emitting the beacon at higher rates. In step S604, the CPU 203 selects the access point emitting the beacon with the highest electric wave intensity from the access points added to the same AP list. According to the present exemplary embodiment, information about the electric wave intensity of the beacon emitted by the access point is included in the setting information about the access point, and the CPU 203 performs the processing in step S604 with reference to this piece of information. The CPU 203 identifies the access point selected in this way as a connection destination of the communication apparatus 101. Subsequently, the CPU 203 ends the processing of the flowchart illustrated in FIG. 6, and the processing proceeds to step S318.

According to the present exemplary embodiment, even if a plurality of access points using different frequency bands and having the same SSID is detected by the communication apparatus 101, these access points are displayed as one access point in the list. This restricts the number of access points displayed in the list, improving the visibility of the list. In a case where the user selects an access point into which a plurality of the access points is consolidated as one access point in this way, any one of the plurality of the access points using different frequency bands and having the same SSID is automatically selected based on the electric wave intensity of the beacon. More specifically, the CPU 203 automatically selects a frequency band of which information is to be added to the setting packet. This configuration enables improving the usability in selecting an access point as a connection destination of the communication apparatus 101.

A third exemplary embodiment will be described in detail below. According to third exemplary embodiment, in a case where the information processing apparatus 102 does not include the network interface 211 for wireless communication, the user manually sets an access point as a connection destination of the communication apparatus 101.

According to the third exemplary embodiment, a communication system similar to the system in the first exemplary embodiment is used, and, unless otherwise noted, elements similar to those in the first exemplary embodiment are to be assumed.

Figure 7:
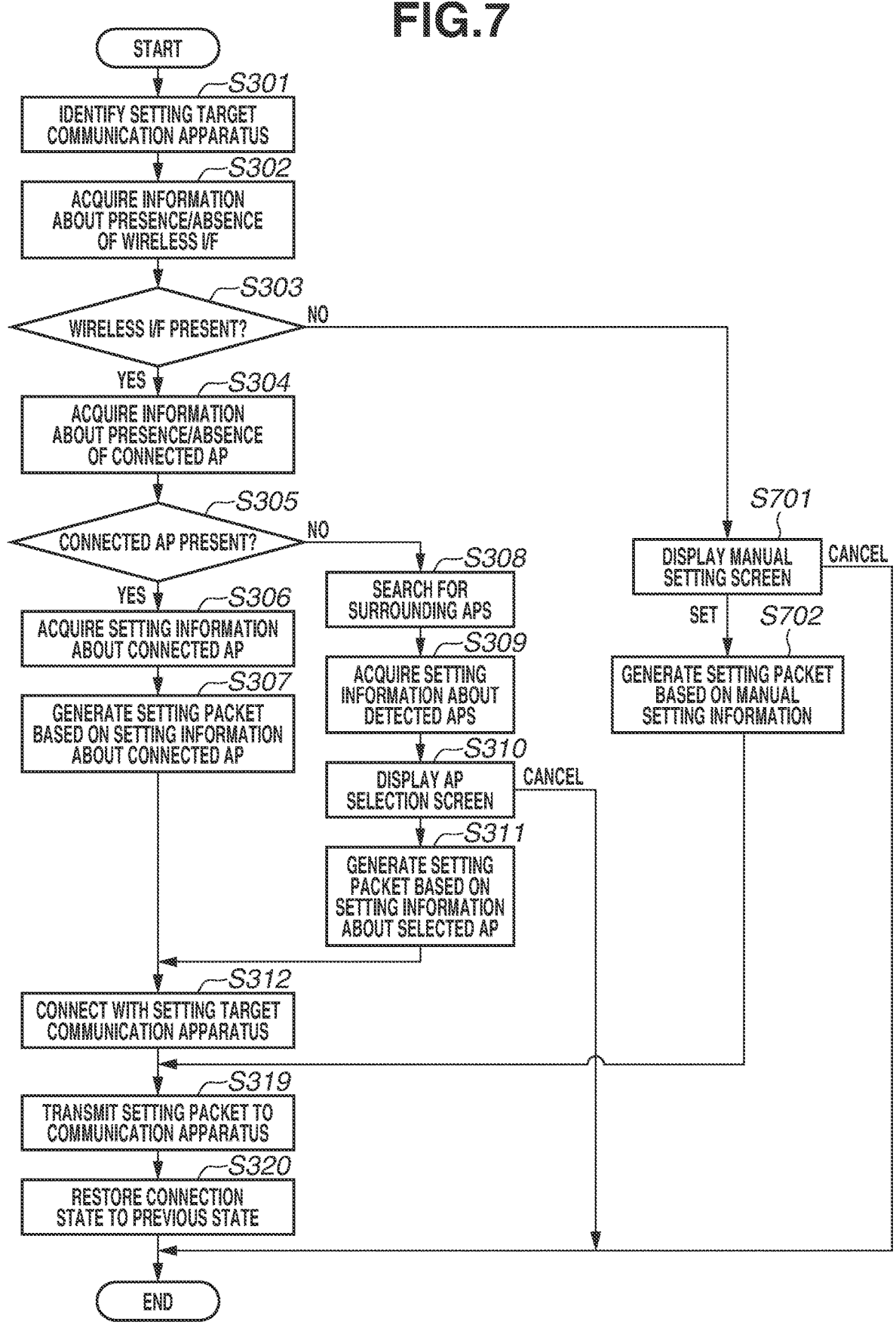
FIG. 7 is a flowchart illustrating network setting processing performed by an information processing apparatus according to a third exemplary embodiment.

FIG. 7 is a flowchart illustrating the network setting processing performed by the information processing apparatus 102 according to the third exemplary embodiment. The flowchart illustrated in FIG. 7 is implemented by the CPU 203 loading a program stored in the ROM 204 or the external storage device 206 into the RAM 205 and then executing the program. More specifically, the processing of the flowchart illustrated in FIG. 7 is implemented by the setup program. The processing of the flowchart illustrated in FIG. 7 is started when a user operation that triggers the network setting processing is performed on a screen displayed by the setup program. The processing of the flowchart illustrated in FIG. 7 is started, for example, in response to activation of the setup program.

Steps S301 to S312, S319, and S320 are similar to those according to the first exemplary embodiment, and redundant descriptions thereof will be omitted.

If the CPU 203 determines that the information processing apparatus 102 does not include the network interface 211 for wireless communication (NO in step S303), the processing proceeds to step S701.

In step S701, the CPU 203 displays a manual setting screen on the display unit 208. The manual setting screen is a screen enabling the user to input the setting information about an access point as a connection destination of the communication apparatus 101. The CPU 203 displays a screen 800 illustrated in FIG. 8 on the display unit 208 as the manual setting screen. The screen 800 includes, for example, areas 801 to 806. The area 801 is an area for inputting an SSID of the access point as a connection destination of the communication apparatus 101. The area 802 is an area for inputting an encryption method (WEP, WPA, etc.) used for connection. The area 803 is an area for inputting a password (passphrase) used for connection. The area 804 is an area for inputting a frequency band used for connection. The area 805 is a set key that is pressed in a case where input is completed. The area 806 is a cancel button for canceling the network setting. The CPU 203 completes the processing in a case where the Cancel button is selected. In a case where the set key is selected in a state where input to the areas 801 to 804 is completed, the processing proceeds to step S702.

In step S702, the CPU 203 generates a setting packet based on the information input by the user via the manual setting screen. More specifically, the setting packet includes the information about the SSID, encryption method, password, and frequency band input by the user via the manual setting screen. Then, the processing proceeds to step S319, where the CPU 203 transmits the setting packet to the communication apparatus 101.

The communication apparatus 101, based on receipt of the setting packet, can then connect to the access point corresponding to the information input by the user. Since the setting packet includes the information about the frequency band, the communication apparatus 101 can identify which frequency band to use to connect to the access point corresponding to the information input by the user.

A fourth exemplary embodiment will be described in detail below. While, in the above-described exemplary embodiments, the communication apparatus 101 supports at least one of 2.4 GHZ and 5 GHz frequency bands, the configuration is not limited thereto. More specifically, the communication apparatus 101 can support any frequency bands. The communication apparatus 101 can support three or more frequency bands.

Before steps S306 and S307, the CPU 203 can perform the AP search result acquisition processing in steps S315 and S316. Then, the CPU 203 can perform the processing in steps S306 and S307 in a case where the acquired AP search result includes information about the access point 103 to which the information processing apparatus 102 is wirelessly connected. In such a case, before steps S306 and S307, the CPU 203 wirelessly connects with the communication apparatus 101 in step S312 and performs the AP search result acquisition processing. In a case where the acquired AP search result does not include information about the access point 103 to which the information processing apparatus 102 is wirelessly connected, the CPU 203 can display the access point selection screen 401 as in step S317 without performing step S307. Then, the CPU 203 can identify the access point selected via the access point selection screen 401 as a connection destination of the communication apparatus 101.

The CPU 203 can perform the AP search result acquisition processing in steps S315 and S316, instead of steps S308 and S309, and display information based on the setting information acquired in the AP search result acquisition processing on the access point selection screen 401 in step S310. Also, in such a case, before steps S308 and S309, the CPU 203 wirelessly connects with the communication apparatus 101 in step S312 and performs the AP search acquisition processing. The CPU 203 can generate a setting packet based on the information manually input by the user by performing steps S701 and S702, instead of steps S308 to S310.

Aspects of the present disclosure are also achieved in the following configuration. A storage medium storing a software program for implementing the functions of the above-described exemplary embodiments is supplied to a system or apparatus, and a computer (including a CPU or micro processing unit (MPU)) of the system or apparatus reads and executes the program stored in the storage medium. In such a case, the program itself read from the storage medium implements the functions of the above-described exemplary embodiments. In this case, the storage medium storing the program is included in the present disclosure.

Usable storage media for supplying a program include, for example, a flexible disk, hard disk, optical disc, magneto-optical disk, compact disc read only memory (CD-ROM), compact disc recordable (CD-R), magnetic tape, nonvolatile memory card, ROM, and digital versatile disc (DVD).

The functions of the above-described exemplary embodiments are implemented by the computer executing the read program. However, the applicable configuration is not limited thereto. A configuration in which an OS operating on the computer performs a part or all of actual processing based on instructions of the program, and the functions of the above-described exemplary embodiments are implemented by the processing is also included in the present disclosure.

A program read from a storage medium is written in a memory included in a function expansion board inserted into the computer or a function expansion unit connected to the computer. Subsequently, a CPU included in the function expansion board or function expansion unit performs a part of all of actual processing based on instructions of the program, and the functions of the above-described exemplary embodiments are implemented by the processing. Such a configuration is also included in the present disclosure.

According to the present disclosure, processing for connecting a communication apparatus that utilizes a plurality of frequency bands and an external apparatus can easily be accomplished.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095913, filed May 12, 2017, which is hereby incorporated by reference herein in its entirety.

What is claimed is:

1. A method for controlling an information processing apparatus communicating with a communication apparatus capable of performing at least wireless communication using a first frequency band and wireless communication using a second frequency band, the method comprising:
    receiving an execution instruction to execute processing for wirelessly connecting the communication apparatus and an external apparatus;
    acquiring, from the communication apparatus, information about at least one external apparatus to which the communication apparatus is connectable;
    displaying a selection screen for selecting one external apparatus from among the at least one external apparatus to which the communication apparatus is connectable, based on the information about the at least one external apparatus to which the communication apparatus is connectable;
    transmitting, in response to receiving the execution instruction, connection information and frequency band information to the communication apparatus, where the connection information is used for wirelessly connecting to an external apparatus and the frequency band information is related to a frequency band used for wirelessly connecting to the external apparatus;
    transmitting a print job instructing the communication apparatus to perform printing to the communication apparatus via the external apparatus to which the communication apparatus is connected by using the connection information and the frequency band information;
    wherein, in a case where a predetermined external apparatus to which the information processing apparatus is connected when the execution instruction is received is included among external apparatuses to which the communication apparatus is connectable, the connection information used for connecting to the predetermined external apparatus and the frequency band information that is related to a frequency band used for connecting to the predetermined external apparatus are transmitted to the communication apparatus,
    wherein, in a case where the predetermined external apparatus is not included among the at least one external apparatus to which the communication apparatus is connectable, the connection information used for connecting to one external apparatus selected via the selection screen from among the at least one external apparatus to which the communication apparatus is connectable and the frequency band information that is related to the frequency band used for wirelessly connecting to the one external apparatus selected via the selection screen are transmitted to the communication apparatus, and
    wherein, in a case where the connection information and the frequency band information have been transmitted to the communication apparatus, the communication apparatus is connected to the external apparatus by using the connection information and using a frequency band corresponding to the transmitted frequency band information from among the first and the second frequency bands.

2. The method according to claim 1, wherein the connection information and the frequency band information to be transmitted in a case where the predetermined external apparatus is included among the at least one external apparatus that the communication apparatus is connectable to are acquired by the information processing apparatus from the predetermined external apparatus.

3. The method according to claim 1, wherein, in a case where the predetermined external apparatus is not included among the at least one external apparatus that the communication apparatus is connectable to, the frequency band information is further transmitted to the communication apparatus and is related to a frequency band used to wirelessly connect to one external apparatus from among the at least one external apparatuses that the communication apparatus is connectable to.

4. The method according to claim 1, further comprising:
    acquiring information about at least one external apparatus that the communication apparatus is connectable to and information about the predetermined external apparatus; and
    determining, based on the information about the at least one external apparatus that the communication apparatus is connectable to and the information about the predetermined external apparatus, whether the predetermined external apparatus is included among the at least one external apparatus that the communication apparatus is connectable to,
    wherein, in a case where the predetermined external apparatus is determined to be included among the at least one external apparatus that the communication apparatus is connectable to, the connection information and the frequency band information are transmitted to the communication apparatus,
    wherein the connection information is used to wirelessly connect to the predetermined external apparatus,
    wherein the frequency band information is related to a frequency band used to wirelessly connect to the predetermined external apparatus, and
    wherein, in a case where the predetermined external apparatus is determined not to be among the at least one external apparatus that the communication apparatus is connectable to, the connection information is transmitted to the communication apparatus, where the connection information is used to wirelessly connect to one external apparatus from among the at least one external apparatus that the communication apparatus is connectable to.

5. The method according to claim 1, further comprising searching to detect external apparatuses in a case where the information processing apparatus is not connected to any external apparatus when the execution instruction is received, wherein, in a case where the information processing apparatus is not connected to any external apparatus when the execution instruction is received, the connection information and the frequency band information are transmitted to the communication apparatus, where the connection information is used to wirelessly connect to one external apparatus from among the detected external apparatuses and where the frequency band information is related to a frequency band used to connect to the one external apparatus.

6. The method according to claim 1, further comprising displaying on a display unit an input screen for receiving an input of the connection information and the frequency band information, wherein the connection information and the frequency band information input via the input screen are transmitted to the communication apparatus.

7. The method according to claim 1, further comprising communicating with the communication apparatus via the external apparatus that the communication apparatus is connected to by using the connection information and the frequency band information.

8. The method according to claim 1, wherein the information processing apparatus communicates with the communication apparatus via wireless communication conforming to an IEEE-802.11 series standard.

9. The method according to claim 1, wherein the frequency band information is information about a communication channel corresponding to a frequency band used to wirelessly connect to the external apparatus.

10. The method according to claim 1, wherein the connection information includes at least one or more of an SSID of the external apparatus and a password used to connect to the external apparatus.

11. The method according to claim 1, wherein the information processing apparatus transmits the connection information and the frequency band information to the communication apparatus by wireless communication compliant with Bluetooth®.

12. The method according to claim 1, wherein the first frequency band is a 2.4 GHz frequency band.

13. The method according to claim 1, wherein the second frequency band is a 5 GHz frequency band.

14. A method for controlling an information processing apparatus communicating with a communication apparatus capable of performing at least wireless communication using a first frequency band and wireless communication using a second frequency band, the method comprising:
receiving an execution instruction to execute processing for wirelessly connecting the communication apparatus and an external apparatus;
acquiring, from the communication apparatus, information about at least one external apparatus to which the communication apparatus is connectable;
displaying a selection screen for selecting one external apparatus from among the at least one external apparatus to which the communication apparatus is connectable, based on the information about the at least one external apparatus to which the communication apparatus is connectable;
transmitting, in response to receiving the execution instruction, connection information and frequency band information to the communication apparatus, where the connection information is used for wirelessly connecting to an external apparatus and the frequency band information is related to a frequency band used for wirelessly connecting to the external apparatus;
wherein, in a case where a predetermined external apparatus to which the information processing apparatus is connected when the execution instruction is received is included among external apparatuses to which the communication apparatus is connectable, the connection information used for connecting to the predetermined external apparatus and the frequency band information that is related to a frequency band used for connecting to the predetermined external apparatus are transmitted to the communication apparatus,
wherein, in a case where the predetermined external apparatus is not included among the at least one external apparatus to which the communication apparatus is connectable, the connection information used for connecting to one external apparatus selected via the selection screen from among the at least one external apparatus to which the communication apparatus is connectable and the frequency band information that is related to the frequency band used for wirelessly connecting to the one external apparatus selected via the selection screen are transmitted to the communication apparatus,
wherein, in a case where the connection information and the frequency band information have been transmitted to the communication apparatus, the communication apparatus is connected to the external apparatus by using the connection information and using a frequency band corresponding to the transmitted frequency band information from among the first and the second frequency bands,
wherein the connection information includes at least one or more of an SSID of the external apparatus and a password used for connecting to the external apparatus.

15. The method according to claim 14, wherein the connection information and the frequency band information to be transmitted in a case where the predetermined external apparatus is included among the at least one external apparatus that the communication apparatus is connectable to are acquired by the information processing apparatus from the predetermined external apparatus.

16. The method according to claim 14, wherein, in a case where the predetermined external apparatus is not included among the at least one external apparatus that the communication apparatus is connectable to, the frequency band information is further transmitted to the communication apparatus and is related to a frequency band used to wirelessly connect to one external apparatus from among the at least one external apparatuses that the communication apparatus is connectable to.

17. The method according to claim 14, further comprising:
acquiring information about at least one external apparatus that the communication apparatus is connectable to and information about the predetermined external apparatus; and
determining, based on the information about the at least one external apparatus that the communication apparatus is connectable to and the information about the predetermined external apparatus, whether the predetermined external apparatus is included among the at least one external apparatus that the communication apparatus is connectable to, wherein, in a case where the predetermined external apparatus is determined to be included among the at least one external apparatus that the communication apparatus is connectable to, the connection information and the frequency band information are transmitted to the communication apparatus, wherein the connection information is used to wirelessly connect to the predetermined external apparatus, wherein the frequency band information is related to a frequency band used to wirelessly connect to the predetermined external apparatus, and wherein, in a case where the predetermined external apparatus is determined not to be among the at least one external apparatus that the communication apparatus is connectable to, the connection information is transmitted to the communication apparatus, where the connection information is used to wirelessly connect to one external apparatus from among the at least one external apparatus that the communication apparatus is connectable to.

18. The method according to claim 14, further comprising searching to detect external apparatuses in a case where the information processing apparatus is not connected to any external apparatus when the execution instruction is received, wherein, in a case where the information processing apparatus is not connected to any external apparatus when the execution instruction is received, the connection information and the frequency band information are transmitted to the communication apparatus, where the connection information is used to wirelessly connect to one external apparatus from among the detected external apparatuses and where the frequency band information is related to a frequency band used to connect to the one external apparatus.

19. The method according to claim 14, further comprising displaying on a display unit an input screen for receiving an input of the connection information and the frequency band information, wherein the connection information and the frequency band information input via the input screen are transmitted to the communication apparatus.

20. The method according to claim 14, further comprising communicating with the communication apparatus via the external apparatus that the communication apparatus is connected to by using the connection information and the frequency band information.

21. The method according to claim 14, wherein the information processing apparatus communicates with the communication apparatus via wireless communication conforming to an IEEE-802.11 series standard.

22. The method according to claim 14, wherein the frequency band information is information about a communication channel corresponding to a frequency band used to wirelessly connect to the external apparatus.

23. The method according to claim 14, wherein the information processing apparatus transmits the connection information and the frequency band information to the communication apparatus by wireless communication compliant with Bluetooth®.

24. The method according to claim 14, wherein the first frequency band is a 2.4 GHz frequency band.

25. The method according to claim 14, wherein the second frequency band is a 5 GHz frequency band.

\* \* \* \* \*